United States Patent
Yang

(10) Patent No.: US 12,487,955 B2
(45) Date of Patent: Dec. 2, 2025

(54) DATA COMMUNICATION SYSTEMS AND METHODS THEREOF

(71) Applicant: Delta Electronics, Inc., Taoyuan (TW)

(72) Inventor: Chih-Chao Yang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 71 days.

(21) Appl. No.: 18/590,987

(22) Filed: Feb. 29, 2024

(65) Prior Publication Data

US 2025/0278377 A1    Sep. 4, 2025

(51) Int. Cl.
| | | |
|---|---|---|
| G06F 13/36 | (2006.01) | |
| G06F 13/362 | (2006.01) | |
| H04L 12/40 | (2006.01) | |

(52) U.S. Cl.
CPC ............ *G06F 13/362* (2013.01); *H04L 12/40* (2013.01); *H04L 2012/40215* (2013.01)

(58) Field of Classification Search
CPC .................. G06F 13/362; H04L 12/40; H04L 2012/40215
See application file for complete search history.

(56) References Cited

U.S. PATENT DOCUMENTS

| | | | | |
|---|---|---|---|---|
| 7,865,644 B2 * | 1/2011 | Drerup | ................. | G06F 13/385 710/110 |
| 10,678,726 B2 * | 6/2020 | Rennig | ................... | G06F 9/542 |
| 11,924,003 B2 * | 3/2024 | Tindell | ................. | H04L 63/0236 |
| 2011/0093635 A1 * | 4/2011 | Matsumoto | ........... | H04L 12/403 710/110 |
| 2016/0234047 A1 * | 8/2016 | Nakamura | ............... | H04L 25/20 |
| 2017/0153997 A1 * | 6/2017 | Chiu | ...................... | G06F 13/404 |
| 2017/0185548 A1 * | 6/2017 | Sakuma | .............. | G06F 13/4282 |

FOREIGN PATENT DOCUMENTS

| | | |
|---|---|---|
| CN | 103188122 A | 7/2013 |
| CN | 109507931 A | 3/2019 |
| CN | 110177013 A | 8/2019 |
| CN | 116033037 A | 4/2023 |
| CN | 117424775 A | 1/2024 |
| JP | H0818579 A | 1/1996 |
| JP | H1165972 A | 3/1999 |

\* cited by examiner

*Primary Examiner* — Henry Tsai
*Assistant Examiner* — Christopher A Daley
(74) *Attorney, Agent, or Firm* — Huan-Yi Lin

(57) ABSTRACT

The present disclosure relates to a data communication system and method thereof. According to the present invention, a system for data communication using controller area network (CAN) protocol is provided. The system comprises a master device, and at least one group of slave devices. The at least one group of slave devices comprises multiple slave devices connected to the master device to receive at least one output data frame from the master device. The at least one output data frame includes a destination indicator and a data length indicator. The destination indicator is configurated to indicate multiple slave devices for receiving the at least one output data frame. The data length indicator is configurated to indicate a data length to be received by each slave device in the at least one of slave devices.

25 Claims, 17 Drawing Sheets

| Function Code | Output Data Count | Data Length Indicator | | | | Output Data | | |
|---|---|---|---|---|---|---|---|---|
| | | Data Length A | Data Length B | Data Length C | Data Length D | Output Data A | Output Data C | Output Data D |
| 0 0 0 1 0 1 1 0 | 0 0 0 0 0 0 1 1 | 0 1 0 0 0 0 0 0 | 0 0 0 0 0 0 0 0 | 1 0 0 0 0 0 0 0 | 0 1 1 0 | (4 words) | (8 words) | (6 words) |

Fig. 3B

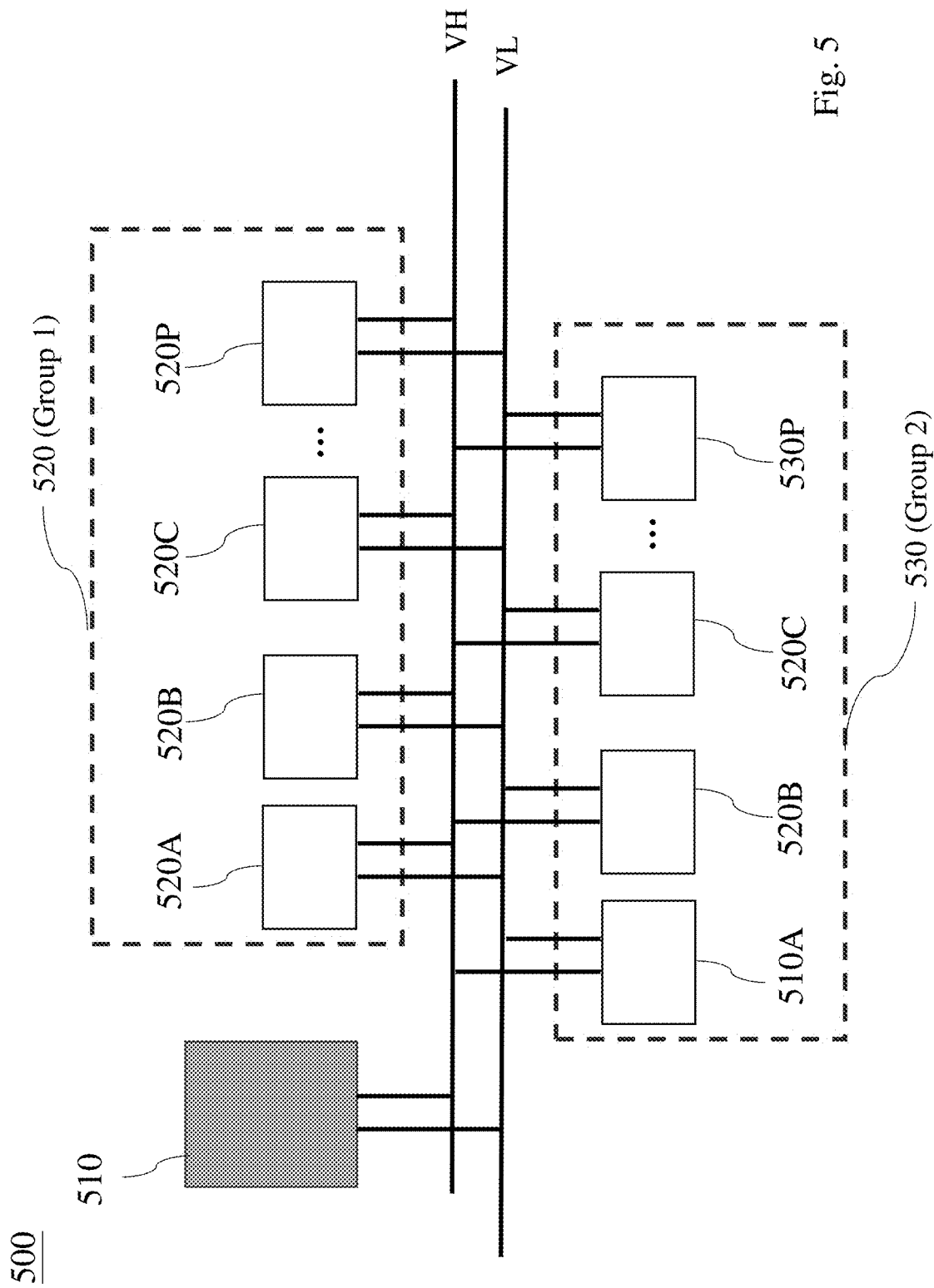

| Function Code | Output Data Count | Data Length Indicator | | | | | | | | | | | | | | | | Output Data |
|---|---|---|---|---|---|---|---|---|---|---|---|---|---|---|---|---|---|---|
| | | A | B | C | D | E | F | G | H | I | J | K | L | M | N | O | P | |
| 0 0 0 1 0 1 0 0 | 0 0 0 0 1 0 1 0 | 1 | 0 | 1 | 1 | 1 | 0 | 0 | 1 | 1 | 1 | 0 | 0 | 0 | 1 | 0 | 1 1 0 | |

| Output Data | | | | | | | | |
|---|---|---|---|---|---|---|---|---|
| Output Data A | Output Data B | Output Data D | Output Data E | Output Data G | Output Data H | Output Data I | Output Data L Output Data M Output Data N | Output Data O Output Data P |
| (4 words) | (2 words) | (2 words) | (1 word) | (1 word) | (4 words) | (2 words) | (1 word) (1 word) (1 word) | (1 word) (2 words) |

Fig. 6B

| Function Code | Output Data Count | Data Length Indicator | | | | | | | | | Output Data | | | | | | | |
|---|---|---|---|---|---|---|---|---|---|---|---|---|---|---|---|---|---|---|
| | | A | B | C | D | E | F | G | H | | Output Data A | Output Data B | Output Data C | Output Data D | Output Data E | Output Data F | Output Data G | Output Data H |
| 0 0 0 1 0 1 0 0 | 0 0 1 1 1 1 1 0 | 0 1 1 1 | 1 1 0 0 | 0 0 0 1 | 0 0 1 0 | 0 1 1 1 | 1 1 1 1 | 1 1 1 1 | 1 1 1 1 | | (4 words) | (2 words) | (2 words) | (2 words) | (4 words) | (4 words) | (4 words) | (4 words) |

Fig. 9B

| Data Length (DL) Indicator + Output Data |||||||||||||||||||||||||||
|---|---|---|---|---|---|---|---|---|---|---|---|---|---|---|---|---|---|---|---|---|---|---|---|---|---|---|
| ID + DL A || Output Data A | ID + DL B || Output Data B | ID + DL D || Output Data D | ID + DL E || Output Data E | ID + DL F || Output Data F | ID + DL G || Output Data G | ID + DL H || Output Data H |
| ID A | 1 | 1 | (4 words) | ID B | 1 | 0 | (2 words) | ID D | 1 | 0 | (2 words) | ID E | 1 | 1 | (4 words) | ID F | 1 | 1 | (4 words) | ID G | 1 | 1 | (4 words) | ID H | 1 | 1 | (4 words) |

Fig. 11B

DATA COMMUNICATION SYSTEMS AND METHODS THEREOF

BACKGROUND OF THE INVENTION

Field of the Invention

The present disclosure relates to data communication systems and methods of managing the same; more particularly, to data communication systems utilizing controller area network (CAN) protocol.

Description of Related Art

Controller area network (CAN) is a message-based communication system, and the protocol for transmitting messages is described in the CAN specification in ISO 11898. It has been adopted in various fields such as in-vehicle electronic networking, aircraft networking, process control systems and medical equipment. CAN 2.0 is one of the most commonly used CAN protocols at present. As shown in FIG. 1A, a CAN 2.0 data frame comprises a start of frame (SOF) field, an arbitration field, a control field, a data field, a cyclical redundancy code (CRC) field, an acknowledge (ACK) field and an end of frame (EOF) field. The CAN 2.0B bus can transmit data at bit rates of up to 1 Mbit/s and data frames can carry a payload of up to 8 bytes. To support higher data rates and larger payloads, CAN with Flexible Data Rate (CAN FD) has been proposed. FIG. 1B shows a CAN FD frame. The CAN FD frame comprises two types of phases, an arbitration phase and a data phase. In the arbitration phase, a first portion and a third portion of the CAN FD frame is transmitted at a standard bit rate (i.e. 1 Mbit/s). In the data phase, a second portion of the CAN FD frame can be transmitted at either a standard bit rate or a high bit rate (for example, 8 times the CAN bit rate). However, the CAN FD frame has longer control field and CRC field. Therefore, it may take more time to transmit a frame when the message is not long enough.

Therefore, it is desirable to develop a new system for data communication that utilizes the Controller Area Network (CAN) including but not limited to CAN FD, which is highly efficient in transmitting both shorter and longer messages.

SUMMARY

According to the present invention, a system for data communication using controller area network (CAN) protocol is provided. The system comprises a master device and at least one group of slave devices. The at least one group of slave devices comprises multiple slave devices connected to the master device to receive at least one output data frame from the master device. The at least one output data frame includes a destination indicator and a data length indicator. The destination indicator is configured to indicate multiple slave devices for receiving the at least one output data frame. The data length indicator is configured to indicate a data length to be received by each slave device in the at least one group of slave devices.

In one embodiment, the at least one output data frame includes an arbitration field and a data field. The arbitration field includes at least one of the destination indicator, the data length indicator, an output data count, and a function code. The output data count is configured to indicate a serial number of refresh cycle conducted by the master device. The function code is configured to indicate whether each slave device connected to the master device is requested to send an input data frame to the master device.

In one embodiment, the at least one output data frame includes an arbitration field and a data field. The arbitration field includes the destination indicator. The data field includes at least one of the data length indicator, an output data count, and a function code.

In one embodiment, the data length to be received by each slave device in the at least one group is not larger than a maximum data length which is four, five, or six words.

In one embodiment, the data field includes a function code configured to indicate whether each slave device connected to the master device is requested to send an input data frame to the master device or to indicate an arrangement of output data from the master device to each slave device in the at least one group.

In one embodiment, the data field includes an output data count configured to indicate a serial number of output data received by the slave device.

In one embodiment, the slave device in the at least one group updates its output data count if the slave device receives new output data in the at least one output data frame.

In one embodiment, the at least one group of slave devices has multiple groups of slave devices and the destination indicator is configured to indicate at least one of the multiple groups of slave devices.

In one embodiment, the master device requests, by a function code in the at least one output data frame, each slave device connected to the master device to send an input data frame to the master device.

In one embodiment, the slave device sends the input data frame to the master device, the input data frame includes an output data count configured to indicate a serial number of refresh cycle conducted by the master device.

In one embodiment, after receiving a request in the at least one output data frame for sending the input data frame to the master device, each slave device sets a timeout period for sending out its own input data frame to the master device.

In one embodiment, the master device determines whether the slave device receives its output data based on the output data count in the input data frame received from the salve device.

In one embodiment, if the master device determines that the slave device does not receive its new output data because the output data count of the slave device does not equal to the output data count of the master device, the master device resends an output data frame to the slave device.

According to the present invention, a method for data communication between a master device and at least one group of multiple slave devices connected to the master device using controller area network (CAN) protocol is provided. The method comprises the master device sending an output data frame to the at least one group of multiple slave devices and requesting that each slave device connected to the master device send an input data frame to the master device; and each slave device sending the input data frame to the master device. The at least one output data frame includes a data length indicator configured to indicate a data length to be received by each slave device in the at least one group of slave devices.

In one embodiment, the data length to be received by each slave device in the at least one group is not larger than a maximum data length which is four, five, or six words.

In one embodiment, the at least one output data frame includes an arbitration field and a data field, the arbitration field includes a destination indicator and the data field includes at least one of the data length indicator, an output data count, and a function code.

In one embodiment, the data field includes a function code configured to indicate whether each slave device connected to the master device is requested to send an input data frame to the master device or to indicate an arrangement of output data from the master device to each slave device in the at least one group.

In one embodiment, the data field includes an output data count configured to indicate a serial number of output data received by the slave device.

In one embodiment, the slave device in the at least one group updates its output data count if the slave device receives new output data in the at least one output data frame.

In one embodiment, the at least one group of slave devices has multiple groups of slave devices and the destination indicator is configured to indicate at least one of the multiple groups of slave devices.

In one embodiment, the master device requests, by a function code in the at least one output data frame, each slave device connected to the master device to send an input data frame to the master device.

In one embodiment, the input data frame includes an output data count configured to indicate a serial number of refresh cycle conducted by the master device.

In one embodiment, after receiving a request in the at least one output data frame for sending the input data frame to the master device, each slave device sets a timeout period for sending out its own input data frame to the master device.

In one embodiment, the master device determines whether the slave device receives its output data based on the output data count in the input data frame received from the salve device.

In one embodiment, if the master device determines that the slave device does not receive its new output data because the output data count of the slave device does not equal to the output data count of the master device, the master device resends an output data frame to the slave device.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 3B is an example of the data field according to the first embodiment of the present disclosure.

FIG. 5 is a schematic diagram of the system for data communication according to the second embodiment of the present disclosure.

FIG. 6B is an example of the data field according to the second embodiment of the present disclosure.

FIG. 9B is an example of the data field according to the third embodiment of the present disclosure.

FIG. 11B is an example of the data field according to another embodiment of the present disclosure.

DETAILED DESCRIPTION OF PREFERRED EMBODIMENTS

Figure 1:
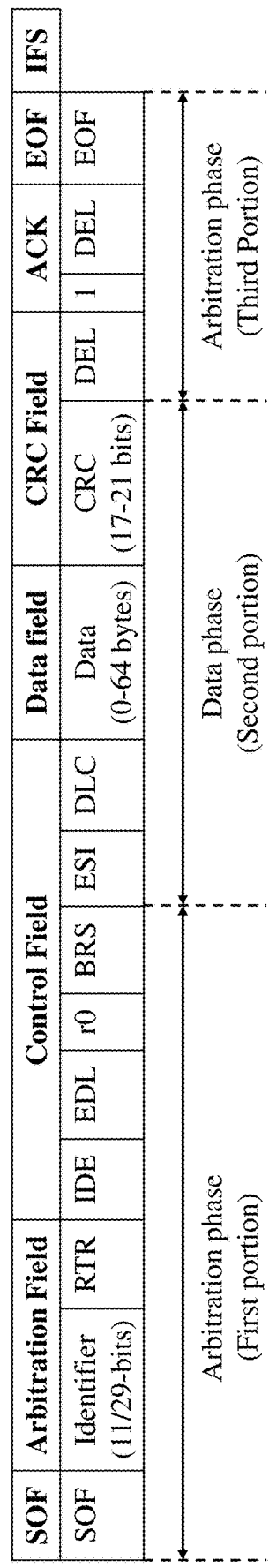
FIG. 1A is a schematic diagram illustrating a CAN 2.0B data frame.
FIG. 1B is a schematic diagram illustrating a CAN FD data frame.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of devices with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Furthermore, it should be understood that the terms, "comprising", "including", "having", "containing", "involving" and the like, used herein are open-ended, that is, including but not limited to. It will be understood that, as used herein, the phrase "and/or" includes any and all combinations of one or more of the associated listed items.

The described embodiments concern one or more methods, systems, apparatuses, and computer readable mediums storing processor-executable process steps for data communication between a master device and at least one group of slave devices. The data communication may comply with certain protocol, for example the controller area network (CAN), the controller area network flexible data rate (CAN FD). The data communication described here may be employed in many circumstances, including industrial automatic control, in-vehicle (e.g. electric vehicles and self-driving vehicles) electronic networking and communication, building automation, electric vehicle charging stations, autonomous mobile robot, unmanned vehicles, smart logistics, aircraft networking, process control systems and medical equipment. Multiple data communications from the master device respectively to each of multiple slave devices in a group with shorter data length in the output data frame to each slave device may be combined or integrated into one data communication. As a result, the data communication between the master device and the group of multiple slave devices becomes more efficient and costs less time. If the data length for a specific slave device in the group is longer, the master device can send a separate output data frame to such slave device. As a result, the data length to such slave device in the output data frame sent from the mater device to the group of multiple slave devices is zero. In addition, if the data length for a specific slave device is regularly longer, such slave device does not need to be included in the group. In a refresh cycle, the master device sends a message, for example in the form of an output data format, separately or combined, to each slave device connected to the master device and requests a response. In one embodiment, the output data in an output data frame sent by the master device to a slave device is also referred to as exchange data output ("EDO"). Each slave device is supposed to send a message, for example in the form of an input data format, back to the master device. In one embodiment, the input data in an input data frame sent by a slave device to the master device is also referred to as exchange data input ("EDI"). However, in a particular cycle or under certain circumstances, one or more slave devices that do not need to be updated may receive zero new output data.

The at least one group of slave devices is connected to the master device to receive at least one output data frame from the master device. In some embodiments, the at least one group of slave devices may include one, two, three, four, five, or six groups of slave devices. As described above, the master device may send one output data frame to a group of multiple slave devices, rather than sending individual output data frame to each of the multiple slave devices in the group to make the data communication more efficient, when the data length for each slave device in the group is not larger than a maximum data length. In one embodiment, the maximum data length for each slave device is four, five, or six words. Each word is two-byte long. When the data length for a specific slave device either in the group or outside the group is larger than a maximum data length, the master device sends a separate output data frame to the specific slave device. After receiving a request from the master device, a slave device may respond by sending an input data frame to the master device.

The at least one output data frame includes a destination indicator and a data length indicator. In one embodiment, the output data frame further includes a source indicator. The destination indicator is configured to indicate one or more slave devices for receiving the at least one output data frame. The destination indicator may indicate a single slave device, a group of multiple slave devices, or all slave devices (broadcasting). In one embodiment, the destination indicator indicates the at least one group of slave devices for receiving the at least one output data frame. In another embodiment, the destination indicator indicates each slave device connected to the master device, including the at least one group of slave devices, for receiving the at least one output data frame. In the situation that a slave device sends an input data frame to the master device, the destination indicator may be configured to indicate the master device as the destination of a message. In contrast, the source indicator is configured to indicate the source of a message, either the master device or the slave device which sends a message. Each individual device, such as the master device and a specific slave device, may have a device ID. In one embodiment, the destination indicator is the same as device ID when that individual device is a recipient. Likewise, the source indicator is the same as device ID when that individual device is a sender. The data length indicator is configured to indicate a data length to be received by each slave device in the at least one group of slave devices. In one embodiment, the data length indicator has two, three, or four bytes to indicate the data length to be received by each slave device in the at least one group. The data length indicator may have multiple portions, each of which is to indicate the length of output data for one slave device in the group of slave devices. The data length indicator for each slave device (one portion) may be continuous or separated with each other.

The at least one output data frame may further comprise an arbitration field and a data field. The arbitration field is a section of the output data frame containing information used to determine the priority of data communication on a bus. The data field is another section of the output data frame containing information for the recipient(s), such as the at least one group of slave devices. In one embodiment where the CAN FD is employed, the at least one output data frame includes a start of frame bit, an arbitration field, a control field, a data field, a CRC field, and an end of frame sequence. The arbitration field may include the destination indicator; the data field may include the data length indicator and the data for the recipient(s).

The at least one output date frame may further Ide a function I which may be part of the arbitration field or the data field. The function code may be configured to indicate the manner to parse and use the data in the data field. For example, the function code in the output data frame is configured to indicate an arrangement of output data from the master device to each slave device in the at least one group. In addition, the function code may be configured to indicate whether each slave device connected to the master device is requested to send an input data frame to the master device. In one embodiment, the function code 0A (HEX) indicates the data field should be parsed in the following manner: the first byte is a function code; the second byte is an output data count, both the third byte and fourth byte are a data length indicator; the remaining of the data field is output data from the master device respectively for each slave device in the group. As described above, the output data in the output data frame sent by the master device to slave device(s) may be referred to as EDO(s). And the function code 0B (HEX) indicates that a response from each slave device (connected to the master device by bus) to the master device is requested, in addition to indicating the data field of the output data frame should be parsed in the above manner. The input data in the input data frame sent by a slave device to the master device as a response may be referred to as exchange data input ("EDI"). As a result, the function code 0A may be described as "Group EDO" and the function code 0B may be described as "Group EDO & all EDI request."

In one embodiment, the data field of the output data frame may further include an output data count which may be part of the arbitration field or the data field. The output data count is configured to indicate a serial number of refresh cycle conducted by the master device. The serial number is regularly increased by one after a refresh cycle. When the output data count reaches its maximum number, it is reset to zero. For example, the output data count may be one byte long, with a value of 0-255. The output data count of output data frame during the first refresh cycle is 0; the output data count of output data frame during the second refresh cycle is 1 (increased by one); and the output data count of output data frame during the third refresh cycle is 2 (increased by one again). In addition to the master device, each slave device also has its own output data count. When a slave device correctly receives new output data in an output data frame from the master device, the slave device updates its output data count to the current number in the output data count of the output data frame. If a slave device does not correctly receive new output data or does not receive any new output data (for example its data length is zero), the slave device does not update its output data count. For example, a slave device updates its output data count from 3 to 5 after it receives from the master device new output data in an output data frame whose output data count is 5.

As described above, the at least one output data frame may comprise an arbitration field and a data field. In addition, the at least one output data frame may include a destination indicator, a data length indicator, a function code, and an output data count, each of which may be part of the arbitration field or the data field. Alternatively, the arbitration field may include at least one of the destination indicator, the data length indicator, the function code, and the output data count. Similarly, the data field may include at least one of the destination indicator, the data length indicator, the function code, and the output data count.

After receiving a request to respond, as indicated by the function code in the at least one output data frame, the slave devices begin to sequentially send an input data frame, back to the master device. In order to handle the situation that a specific slave device does not respond in its turn, a timeout mechanism may be implemented so that the slave device whose order is right after the specific slave device continues to send out an input data frame to the master device.

In one embodiment, the input data frame may include an output data count which has the same value as the output data count of a slave device at that time. The master device may use the output data count of the slave device and output data count of the master device to check whether a slave device correctly received the output data ("EDO") from the master device. Thus, the output data count of the input data frame to certain extent may replace the acknowledge (ACK) in the CAN 2.0 data frame. If a slave device does not correctly receive its output data from the master device or does not respond by sending an input data in its turn, the master device separately resends the output data to the slave device and request a response.

Figure 2:
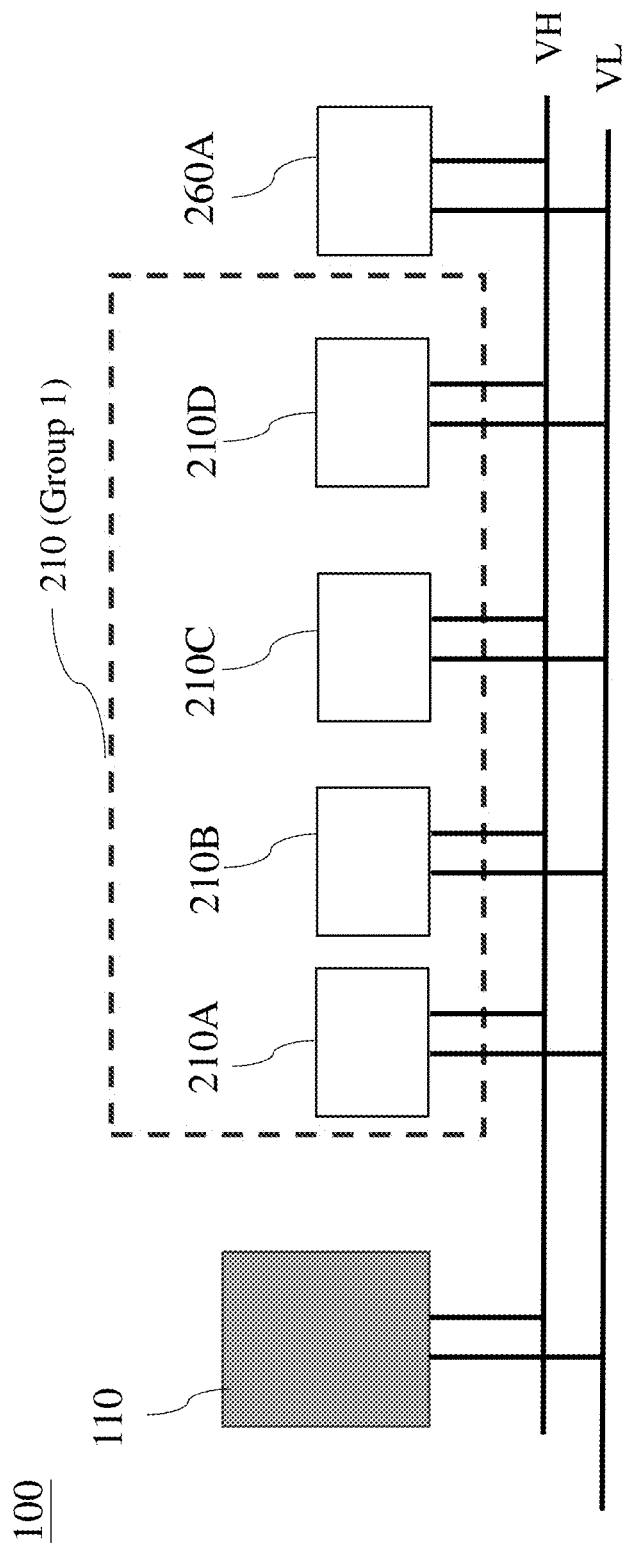
FIG. 2 is a schematic diagram of the system for data communication according to the first embodiment of the present disclosure.

In a first embodiment as shown in FIG. 2, the system for data communication 100 includes a master device 110 and five slave devices 210A, 210B, 210C, 210D, and 260A. The four slave devices 210A-D are designated to Group 1 because they often receive output data shorter than maximum data length. The slave device 260A does not belong to Group 1 possibly because it often receives output data longer than maximum data length. The master device 110 is connected with the slave devices through a differential signal pair, VH for the wire biased to a higher voltage potential and VL for the wire biased to a lower voltage potential. In one embodiment, the master device 110 is an industrial computer and the slave devices are distance sensors in a vehicle. The master device 110 may periodically send an output data frame to the slave devices and requests an input data frame as a response from the slave devices. In one embodiment shown in FIG. 3A, the output data frame includes an arbitration field and a data field. The arbitration field further includes a source indicator and a destination indicator. The source indicator is configured to indicate the device sending out a message (input data frame or output data frame) to the wires. The destination indicator is configurated to indicate one or more slave devices for receiving an output data frame, or the master device for receiving an input data frame. In one embodiment, the destination indicator may have 4 bits to represent a value between 0 and 15. Each value may correspond to the master device, a single slave device, a group of multiple slave devices, or all slave devices (broadcasting). As a result, the system 110 may assign a specific value to each individual device including the master device and each slave device, a group of multiple slave devices, and all slave devices (broadcasting). All devices connected to the wires/buses can hear all the input/output data frames transmitted thereon but only the device(s) whose ID is covered by the destination indicator actually receive and process the data frames. Below is a table for the destination indicator and corresponding device(s) to receive the input/output data frame.

TABLE 1

| Destination indicator | Device(s) |
| --- | --- |
| 1 | Master device 110 |
| 2 | Slave device 210A |
| 3 | Slave device 210B |
| 4 | Slave device 210C |
| 5 | Slave device 210D |
| 6 | Slave device 260A |
| . . . | . . . |
| 13 | Group 1 |
| 14 | For initialization setup |
| 15 | All slave devices (broadcasting) |

Figure 3A:
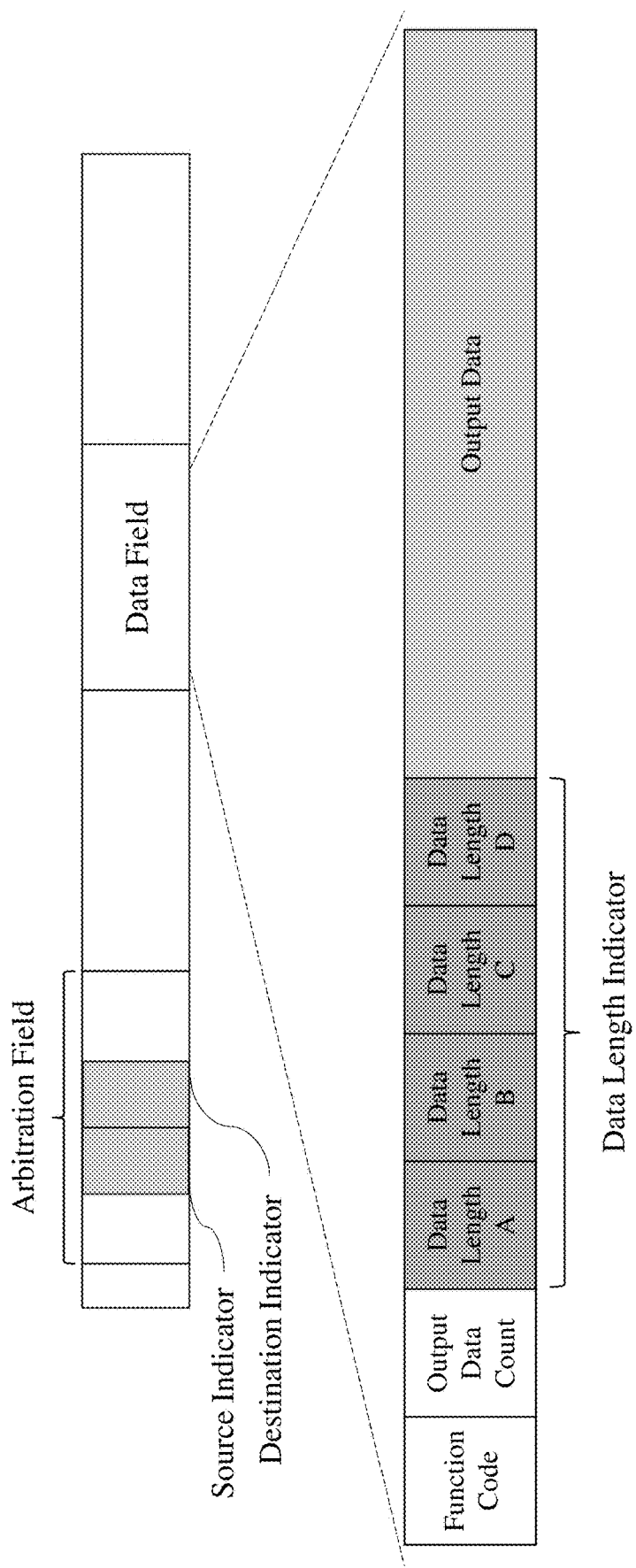
FIG. 3A is a schematic diagram illustrating the output data frame according to the first embodiment of the present disclosure.
Figure 3C:
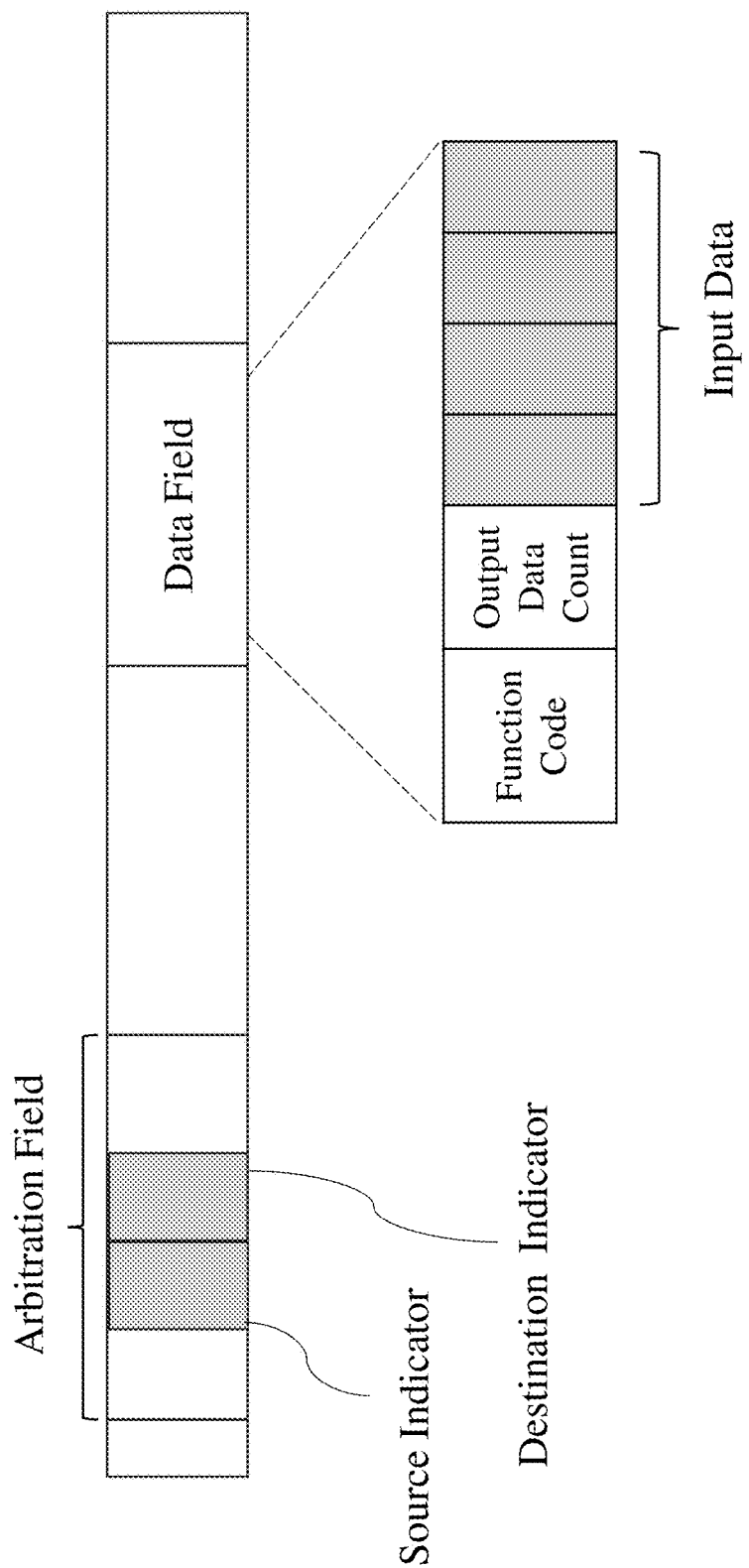
FIG. 3C is a schematic diagram illustrating the input data frame according to the first embodiment of the present disclosure.

In the first embodiment, as shown in FIGS. 3A and 3B, the output data frame includes an arbitration field and a data field. The arbitration filed includes the 4-bit destination indicator, ranging from 0-15, configured to respectively indicate the master device, each individual slave device, Group 1, and all slave devices (broadcasting) as shown in Table 1. The data field includes a 1-byte function code configured to indicate the manner of parsing the data field and the function of the output data frame. In other words, based on the function code, a slave device would know how to interpret the data field and retrieve the data for itself. In one embodiment, the function code is the first byte of the data field. Among many other functions, the function code 0A (HEX) indicates the remaining data in the data field is EDOs for the slave devices in Group 1 based on the data length indicator. In addition to such indication, the function code 0B (HEX) further requests all slave devices receiving this output data frame to respond by sending an input data frame, as shown in FIG. 3C, back to the master device 110. When the function code is 0B, the destination indicator usually is 15 indicating all slave devices (broadcasting).

In one embodiment, the data field may further include a 1-byte output data count which is a serial number of refresh cycle conducted by the master device, such as 0-255. The master device periodically refreshes all slave devices. In each cycle, the master device sends the output data frame to all slave devices and sequentially receives the input data frame from each slave device. After a complete cycle, the output data count is increased by one. The output data count may be used to check whether a slave device correctly receives the output data frame. In one embodiment, the output data count is right after the function code in the data field.

As described above, the data field includes the data length indicator. In one embodiment, the data length indicator is 2-byte (16-bit) long with 4 bits to indicate the data length for each of the four slave devices in Group 1. In this case, the maximum data length to be received by a slave device in Group 1 may be 8 words. After the function code and the output data count in the data field, in one embodiment, the data length indicator may be 0100 0000 1000 0110 to indicate that the first slave device 210A receives 4 words; the second slave device 210B receives 0 words; the third slave device 210C receives 8 words; and the fourth slave device 201D receives 6 words. In this embodiment, the data length indicator for each slave device in the group is continuous with each other. The data length indicator for the first slave device is directly followed by the data length indicator for the second slave device. The real output data for each slave device may follow the data length indicator.

Figure 4A:
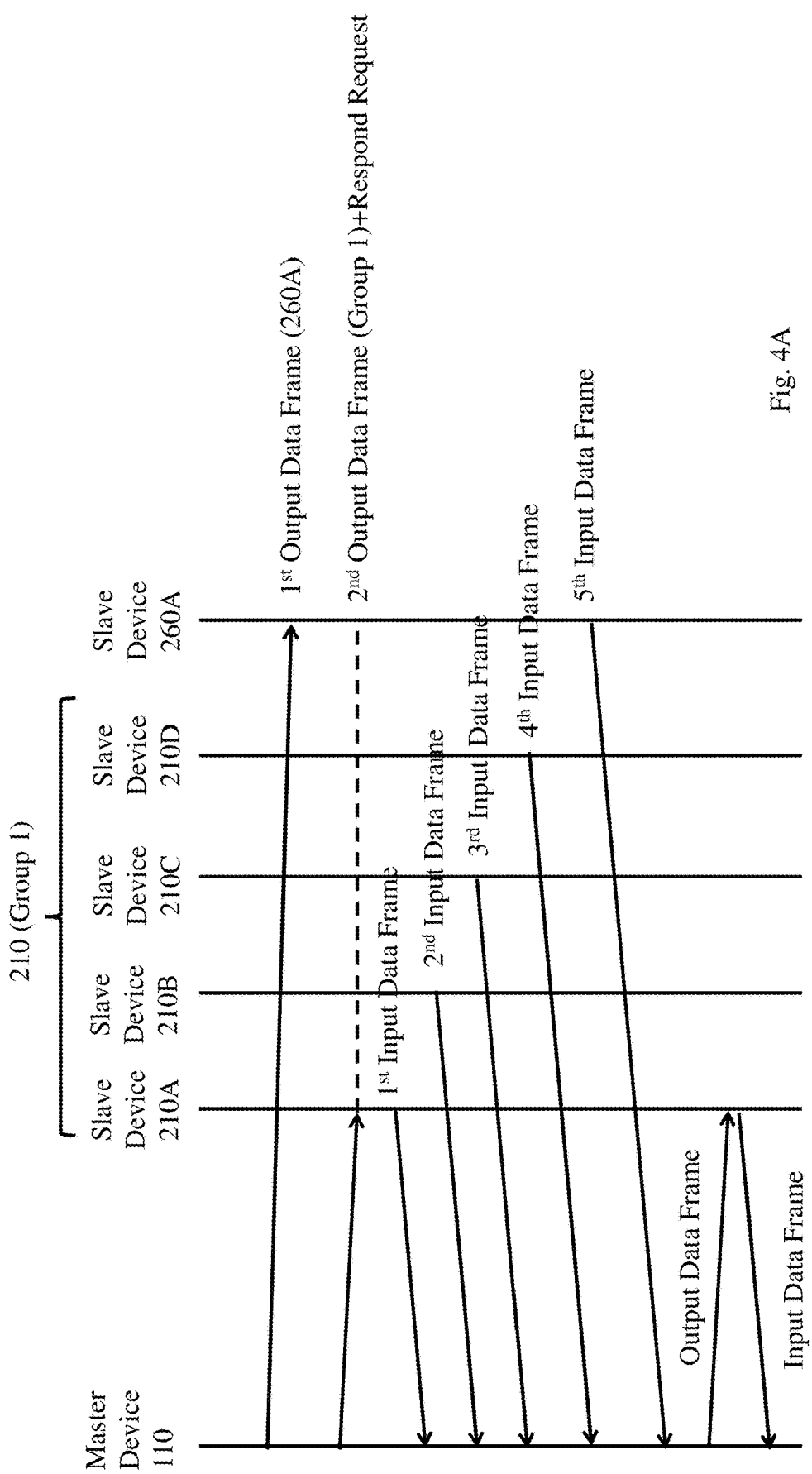
FIG. 4A is a flow chart of data communication according to the first embodiment of the present disclosure.

In one embodiment, as shown in FIG. 4A, during the 4th refresh cycle (the output data count is 3), the master device sends a first output data frame to the slave device 260A because its data length is larger than 8 words, for example 10 words. Then the master device sends a second output data frame to all slave devices including output data for the slave devices in Group 1 and requests all slave devices to respond. In the first output data frame, the destination indicator is 6 and thus only the slave device 260A receives the first output data frame. In the second output data frame, the destination indicator is 15 (broadcasting) and thus all slave devices receive the second output data frame. The function code in the second data frame is 0B which indicates the output data in the data field is for the slave devices in Group 1 and at the same time requests all slave devices to respond.

Then each slave device connected to the master device from 210A-D and 260A sequentially responds by sending an input data frame, to the master device 110. Each slave device may hear the input data frame sent (transmitted) to the bus by any other slave device. A slave device sends out its own input data frame after hearing its preceding slave device sending out an input data frame. For example, the slave device 210A sends a first input data frame to respond. After hearing the first input data frame sent to the bus by the slave device 210A, the salve device 210B begins to send a second input data frame to the bus.

Figure 4B:
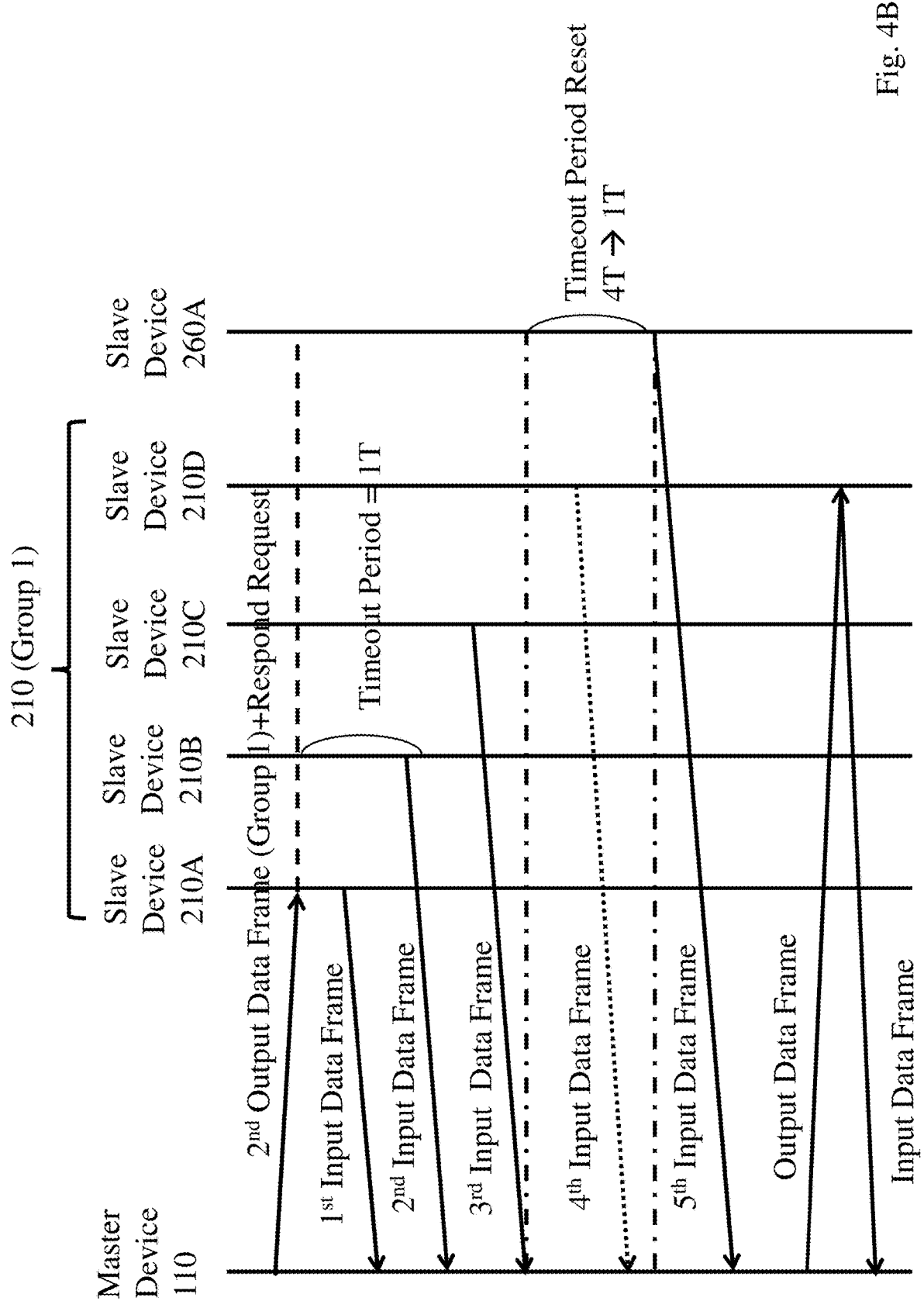
FIG. 4B is a flow chart of data communication with timeout mechanism according to the first embodiment of the present disclosure.

A time-out mechanism is provided to cope with the problem that a slave device failed to send an input data frame. As a result, a slave device still sends out its input data frame after a time-out period even if it does not hear the preceding slave device sends out an input data frame. In one embodiment, the time-out period of the Nth slave device is set to be (N-1)T where T is a predetermined time period, for example 10 ms. If the Nth slave device hears the N-2 slave device sends out its input data frame, the time-out period of the Nth slave device is reset to T. For example, as shown in FIG. 4B, when all slave devices receive a request to respond, the time-out period for slave devices 210A-D and 260A is respectively set to be 0, 1T, 2T, 3T, 4T. After hearing the third slave device 210C sends out its input data frame, the fifth slave device 260A resets its time-out period from 4T to T. Thus, if the fourth slave device 210D does not send out an input data frame as expected, the fifth slave device 260A sends out its input data frame T period of time after hearing the input data frame sent by the third slave device 210C. After noticing that the fourth slave device does not send out an input data frame as expected, the master device then resends a separate output data frame to the fourth slave device and requests a response, e.g. an input data frame.

As shown in FIG. 3C, the data field of an input data frame includes an output data count. In general, the output data count of the input data frame equals to the current output data count of the slave device sending out the input data frame to respond. However, when a slave device receives 0 output data in the output data frame, its output data count remains the same and is not updated. Thus, the slave device uses its original and current output data count as the output data count of the input data frame sent to the master device. For example, if the second slave device 210B received zero output data in the $4^{th}$ refresh cycle (output data count is 3), the output data count of the input data frame sent by the second slave device 210B in response remains 2. Assuming the second slave device 210B does receive new output data in the $3^{rd}$ refresh cycle. By checking the output data count of the input data frame, the master device may confirm that the second slave device 210B receives its output data frame with empty output data for itself in the 4th refresh cycle. Therefore, the master device may not resend an output data frame to the second slave device 210B.

The output data count of all other slave devices which correctly receive new output data during the 4th refresh cycle should be updated to 3 which is used for the output data count of the input data frame sent back to the master device 110. Thus, if the output data count of the input data frame sent by the first slave device 210A is not 3, the master device notices that the first slave device does not correctly receive its output data. As a result, in FIG. 4A, after receiving a response (input data frame) from all other slave devices, the master device may resend an output data frame to the first slave device 210A and request a response separately.

In a second embodiment as shown in FIG. 5, the system for data communication 500 includes a master device 510 and 32 slave devices 520A-520P, 530A-530P. The first 16 slave devices 520A-520P are designated to Group 1 and the second 16 slave devices 530A-530P are designated to Group 2. The master device 510 is connected with the slave devices through a differential signal pair, VH for the wire biased to a higher voltage potential and VL for the wire biased to a lower voltage potential. In one embodiment, the master device 510 is an industrial computer and the slave devices are robotics for smart manufacturing. The master device 510 may periodically send an output data frame to the slave devices and request an input data frame as a response from the slave devices. In this embodiment, the one cycle data communication may only cost about 56% of the time, compared to the situation that the master device has to separately send an output data frame to each of the 32 slave devices.

Figure 6A:
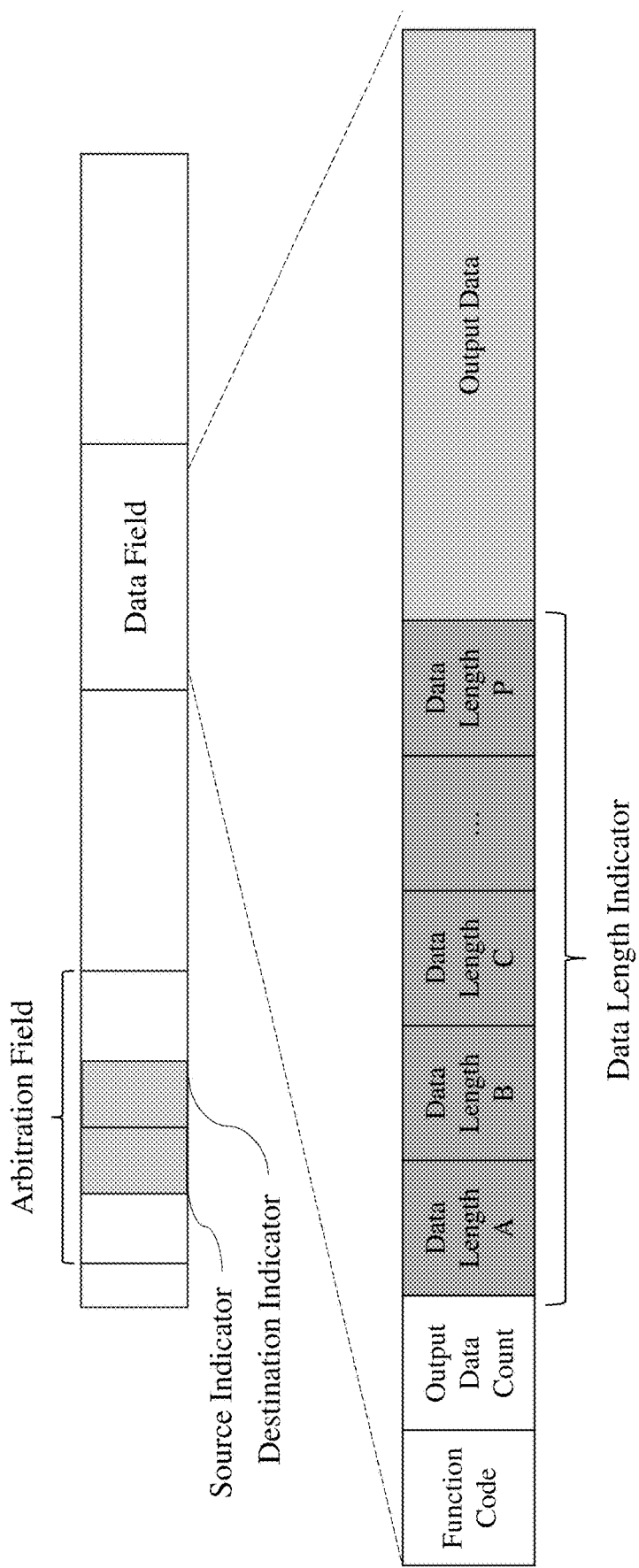
FIG. 6A is a schematic diagram illustrating the output data frame according to the second embodiment of the present disclosure.

In one embodiment as shown in FIGS. 6A and 6B, both the output data frame and the input data frame have an arbitration field and a data field. The arbitration field further includes a source indicator and a destination indicator. Below is an example of the destination indicator.

TABLE 2

| Destination indicator | Device(s) |
| --- | --- |
| 1 | Master device 510 |
| 10-25 | Respectively slave device 520A-520P |
| 26-41 | Respectively slave device 530A-530P |
| 42-57 | RTU Slave device |
| 58 | Group 1 |
| 59 | Group 2 |
| 62 | For initialization setup |
| 63 | All slave devices (broadcasting) |

In one embodiment, the data field of the output data frame further includes 1-byte function code, 1-byte output data count, 4-byte data length indicator, and up to 29 words (58 bytes) output data. Table 3 below illustrates one example of the 1-byte function code. The 1-byte output data count indicates the refresh cycle, e.g. 0-255. The output data count is increased by 1 when a refresh cycle is completed. In this embodiment, the output data count of the output data frame is also referred to as EDO count. When the output data count reaches 255, it is reset to 0 for the next cycle. The 4-byte data length indicator uses 2 bits to indicate the data length for each of the 16 slave devices in a group. For example, 00 indicates no data; 01 indicates the data length is one word; 10 indicates the data length is 2 words; 11 indicates the data length is 4 words. The maximum data length is 4 words. Thus, the data length indicator of 11 10 00 10 01 00 01 11 10 00 00 01 01 01 01 10 indicates the data length of slave devices 520A-520P is respectively 4, 2, 0, 2, 1, 0, 1, 4, 2, 0, 0, 1, 1, 1, 1, and 2 words. In this example, the slave devices 520C, 520F, 520J, and 520K receive zero output data during this cycle and their output data count remains the same, such as 9. The output data count for other slave devices in Group 1 is updated to 10.

TABLE 3

| Function code (Hex) | Description |
| --- | --- |
| 01 | ID assignment |
| 02 | Release token for next device |
| 03 | Read device information |
| 04 | device unique ID |
| 07 | Read device initialization error code |
| 08 | Enter operation |
| 09 | Read operation status |
| 0A | Group 1 EDO |
| 0B | Group 1 EDO & all EDI request (Broadcast) |
| 0C | Group 2 EDO |
| 0D | Group 2 EDO & all EDI request |
| 0E | EDO and EDO counter Write |
| 0F | EDO and EDO counter Write & EDI Read |
| 10 | Set DO Enable/Disable |
| 11 | Set device Run/Stop |
| 12 | device CR Read |
| 13 | Module CR Write |
| 14 | EDI |

Figure 7:
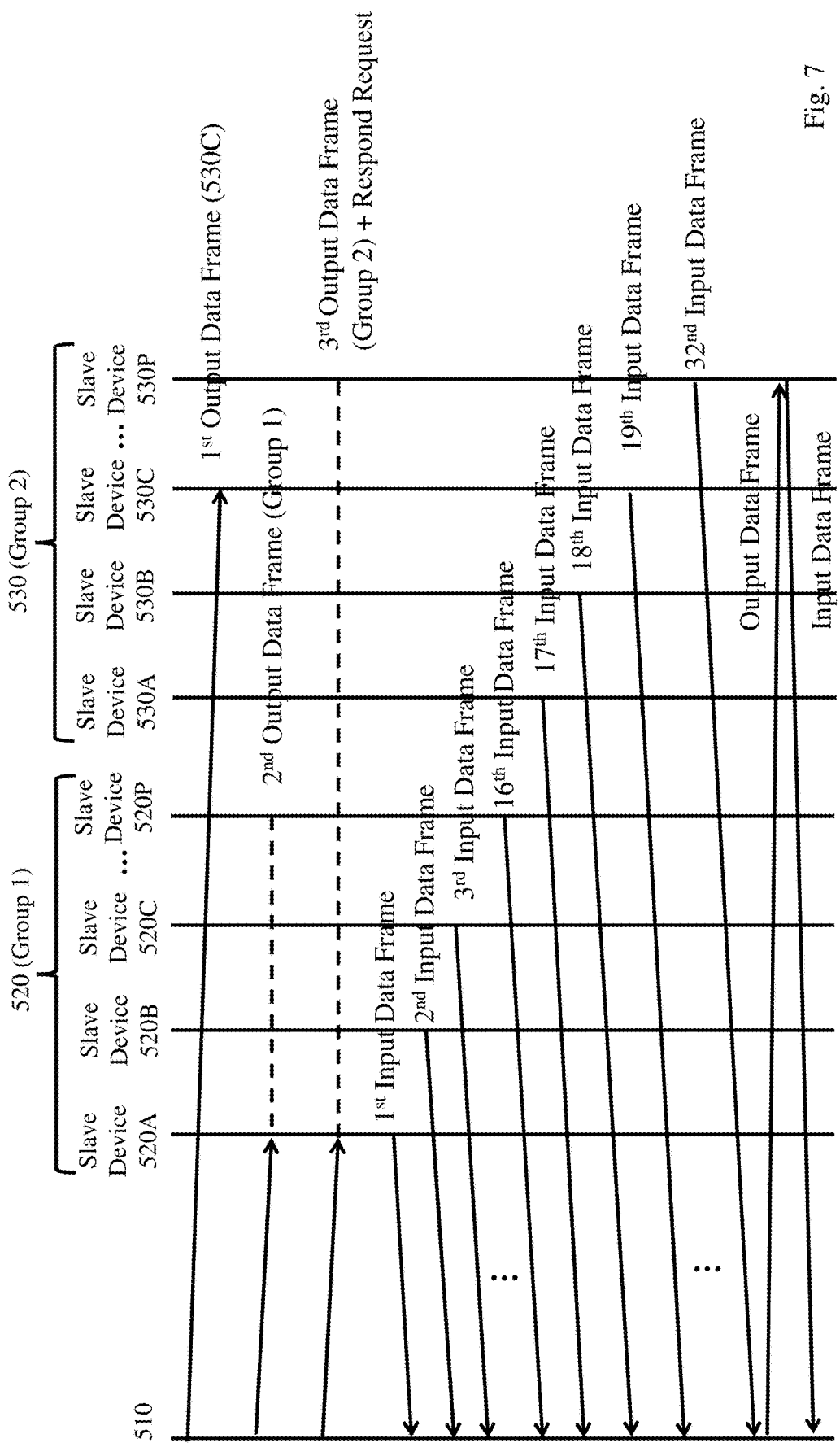
FIG. 7 is a flow chart of data communication according to the second embodiment of the present disclosure.

In one embodiment as shown in FIG. 7, during the 11th refresh cycle (the output data count is 10), the master device 510 sends a first output data frame to the slave device 530C because its data length is larger than 4 words, for example 8 words. The function code of the first output data frame is 0E (HEX) for "EDO and EDO counter write." Then the master device sends a second output data frame to the Group 1 slave devices. The second output data frame has the destination indicator at 58 indicating Group 1 and the function code at 0A (HEX) indicating "Group 1 EDO." Next, the master device sends a third output data frame to all slave devices with output data for the Group 2 slave devices. The third output data frame has the destination indicator at 63 indicating all slave devices (broadcasting) and the function code at 0D (HEX) indicating "Group 2 EDO+all EDI request." After all slave devices receive a request for input data frame, each slave device begins to send an input data frame to the master device sequentially. The input data frame includes a data field which further includes a function code and an output data count. The output data count of the input data frame equals to the current output data count of the slave device sending the input data frame to the master device. The master device may check the output data count of the input data frame to determine whether such slave device correctly receives its output data in the output data frame.

If the data length for a specific slave device is longer than the maximum data length, a separate output data frame is sent to such slave device before the output data frame sent to each slave device connected to the master device (broadcasting) requesting for a response. In that situation, the data length for the specific slave device is zero in the output data frame to the group to which the specific slave device belongs. For example, during the 11th refresh cycle, the first output data frame is separately sent to slave device 530C because its data length is 8 words, longer than the maximum data length 4 words. The output data count of the slave device 530C is updated to 10. In addition, the data length for the slave device 530C in the third output data frame with output data for Group 2 slave devices is zero.

After all slave devices receive the third output data frame, the time-out period (N-1)T is set for each slave device. For example, the time-out period for slave devices 520A-520E is respectively 0, 1T, 2T, 3T, and 4T. The slave device 520A sends the first input data frame back to the master device 510. After hearing the first input data frame sent by the slave device 520A, the slave device 520C resets its time-out period from 2T to 1T. If the slave device 520B fails to send an input data frame back to the master device 510, 1T after the first slave device 520A sent its input data frame, the third slave device 520C sends its input data frame to the master device 510.

In one embodiment as shown in FIG. 7, the slave device 530P does not correctly receive its output data, which is 2 words long, its output data count is not updated to 10. Thus, the output data count of the input data frame sent by the slave device 530P to the master device is not 10. The master device notices the error and separately sends a fourth output data frame to only slave device 530P. The fourth output data frame has a destination indicator at 41 for slave device 530P, a function code at 0F (HEX) for "EDO and EDO counter write, and EDI Read" and an output data count at 10. After receiving the fourth output data frame, the slave device 530P sends an input data frame with the output data count at 10 back to the master device as a response. Then the master device may confirm that slave device 530P correctly receives its output data during the 11th refresh cycle.

Figure 8:
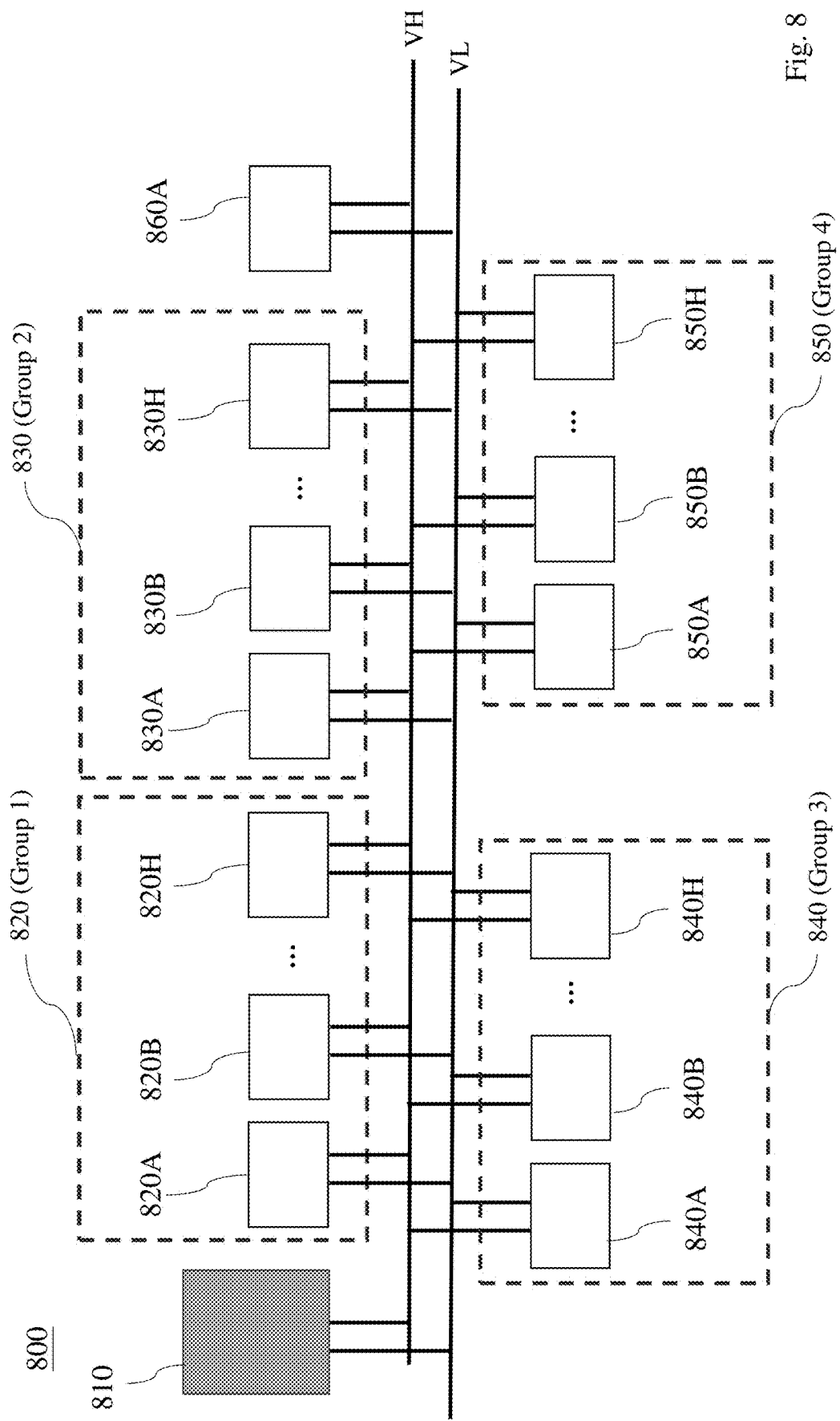
FIG. 8 is a schematic diagram of the system for data communication according to the third embodiment of the present disclosure.

In a third embodiment as shown in FIG. 8, the system for data communication 800 includes a master device 810 and 33 slave devices 820A-820H, 830A-830H, 840A-840H, 850A-850H, and 860A. The first 8 slave devices 820A-820H are designated to Group 1; the second 8 slave devices 830A-830P are designated to Group 2; the third 8 slave devices 840A-840H are designated to Group 3; and the fourth 8 slave devices 850A-850H are designated to Group 4. Compared to the second embodiment, this embodiment may have better performance when most of the slave devices in the groups regularly receive longer data but still not longer than the maximum data length. As a result, each group may only include 8 slave devices, rather than 16 slave devices in the second embodiment. The master device 810 is connected with the slave devices through a differential signal pair, VH for the wire biased to a higher voltage potential and VL for the wire biased to a lower voltage potential. The master device 810 may periodically send an output data frame to the slave devices and requests an input data frame as a response from the slave devices.

In one embodiment, both the output data frame and the input data frame have an arbitration field and a data field. The arbitration field further includes a source indicator and a destination indicator. Below is an example of the destination indicator.

TABLE 4

| Destination indicator | Device(s) |
| --- | --- |
| 1 | Master device 810 |
| 10-17 | Respectively slave device 820A-820H |
| 18-25 | Respectively slave device 830A-830H |
| 26-33 | Respectively slave device 840A-840H |
| 34-41 | Respectively slave device 850A-850H |
| 42 | Slave device 860A |
| ... | ... |
| 58 | Group 1 |
| 59 | Group 2 |
| 60 | Group 3 |
| 61 | Group 4 |
| 62 | For initialization setup |
| 63 | All slave devices (broadcasting) |

Figure 9A:
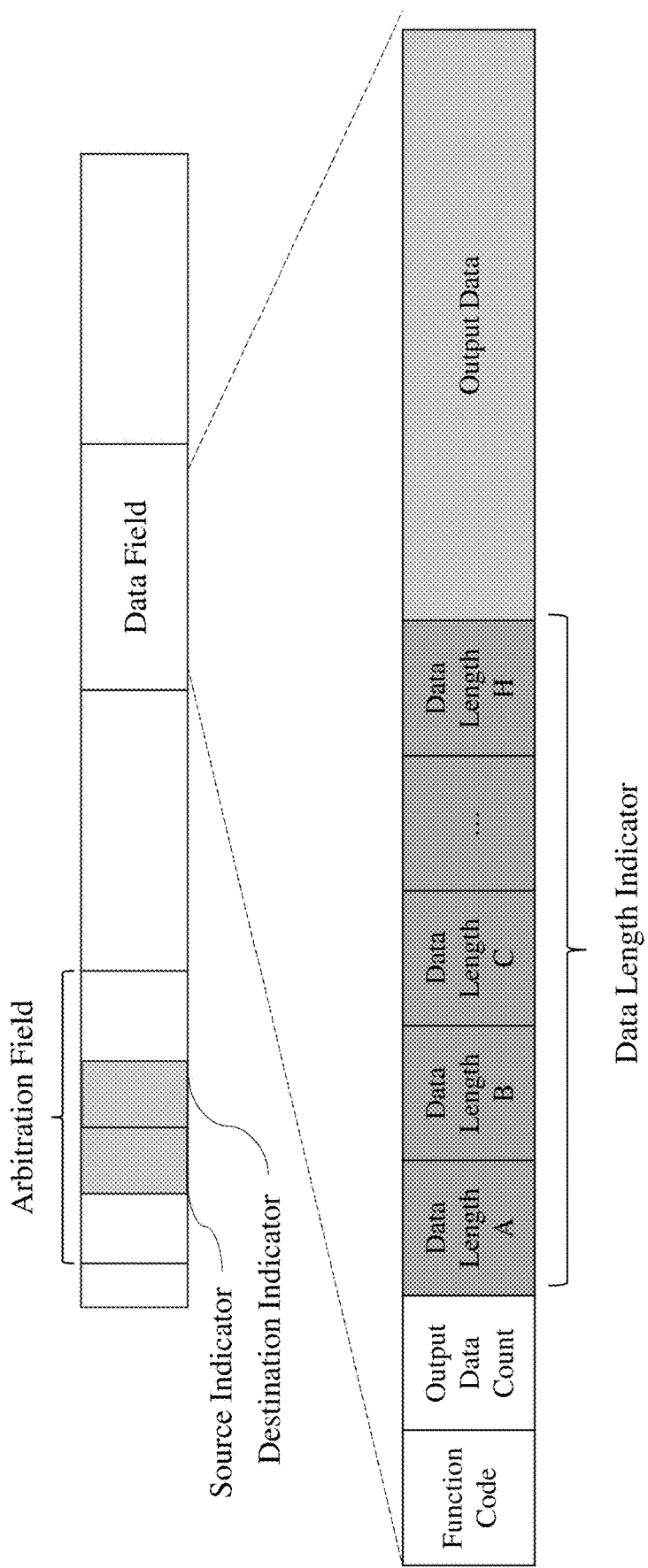
FIG. 9A is a schematic diagram illustrating the output data frame according to the third embodiment of the present disclosure.

In one embodiment as shown in FIGS. 9A and 9B, the data field further includes 1-byte function code, 1-byte output data count, 2-byte data length indicator, and up to 30 words (60 bytes) output data. Table 5 below illustrates one example of the 1-byte function code. The 1-byte output data count indicates a serial number of refresh cycle conducted by the master device, e.g. 0-255. The output data count is increased by 1 when a refresh cycle is completed. In this embodiment, the output data count of the output data frame is also referred to as EDO count. When the output data count reaches 255, it is reset to 0 for the next cycle. The 2-byte data length indicator uses 2 bits to indicate the data length for each of the 8 slave devices in a group. For example, 00 indicates no data; 01 indicates the data length is one word; 10 indicates the data length is 2 words; and 11 indicates the data length is 4 words. The maximum data length is 4 words. Thus, the data length indicator of 11 10 00 10 11 11 11 11 indicates the data length for slave devices 820A-820H is respectively 4, 2, 0, 2, 4, 4, 4, and 4 words. In this example, the slave devices 820C receives zero output data during this cycle and its output data count remains the same, such as 125. The output data count of other slave devices in Group 1 receiving new output data is updated to 126.

TABLE 5

| Function code (Hex) | Description |
| --- | --- |
| 01 | ID assignment |
| 02 | Release token for next device |
| 03 | Read device information |
| 04 | device unique ID |
| 07 | Read device initialization error code |
| 08 | Enter operation |
| 09 | Read operation status |
| 0A | Group 1 EDO |
| 0B | Group 1 EDO & all EDI request (Broadcast) |
| 0C | Group 2 EDO |
| 0D | Group 2 EDO & all EDI request |
| 0E | Group 3 EDO |
| 0F | Group 3 EDO & all EDI request (Broadcast) |
| 10 | Group 4 EDO |
| 11 | Group 4 EDO & all EDI request (Broadcast) |
| 12 | EDO and EDO counter Write |
| 13 | EDO and EDO counter Write & EDI Read |
| 14 | Set DO Enable/Disable |
| 15 | Set device Run/Stop |
| 16 | device CR Read |
| 17 | device CR Write |
| 18 | EDI |

Figure 10:
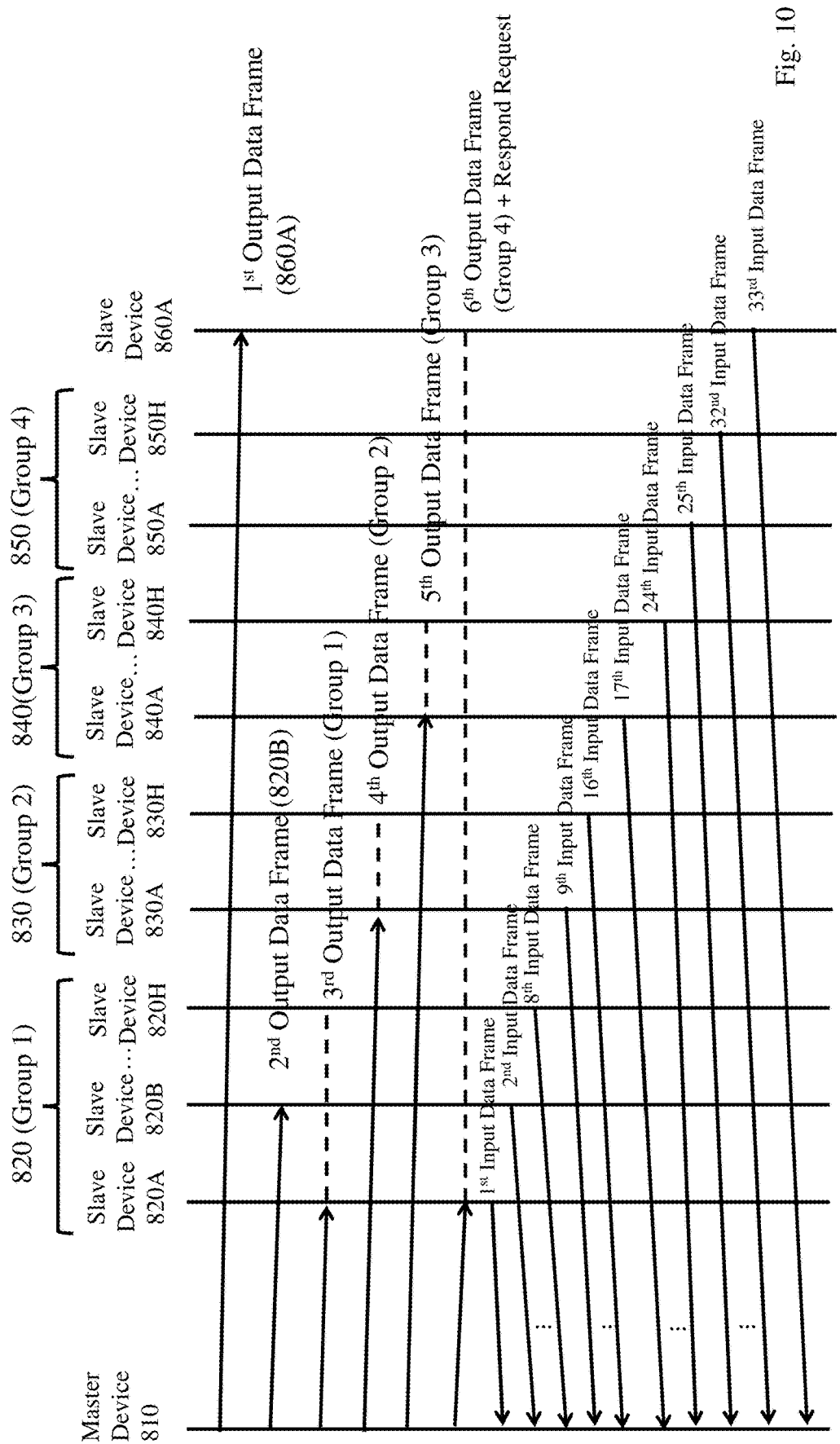
FIG. 10 is a flow chart of data communication according to the third embodiment of the present disclosure.

In one embodiment as shown in FIG. 10, during the 127th refresh cycle (the output data count is 126), the master device 810 sends a first output data frame to the slave device 860A with the destination indicator at 42 because its data length is more than 4 words, for example 8 words. The function code of the first output data frame is 12 (HEX) for "EDO and EDO counter write." Then the master device 810 sends a second output data frame to the slave device 820B with the destination indicator at 11 also because its data length is more than 4 words, for example 6 words. The function code of the second output data frame is 12 (HEX) for "EDO and EDO counter write." Next, the master device sends a third output data frame to Group 1 slave devices. The third output data frame has the destination indicator at 58 indicating Group 1 and the function code at 0A (HEX) indicating "Group 1 EDO." The master device 810 continues to send a fourth output data frame to the Group 2 slave devices. The fourth output data frame has the destination indicator at 59 indicating Group 2 and the function code at 0C (HEX) indicating "Group 2 EDO." The master device 810 sends a fifth output data frame to the Group 3 slave devices. The fifth output data frame has the destination indicator at 60 indicating Group 3 and the function code at 0E (HEX) indicating "Group 3 EDO." Lastly, the master device 810 sends a sixth output data frame to all slave devices (broadcasting) with the destination indicator at 63 and the function code at 11 (HEX) indicating "Group 4 EDO+all EDI request." After all slave devices receive a request for input data frame, each slave device begins to send an input data frame to the master device sequentially. The input data frame includes a data field which further includes a function code and an output data count. The output data count of the input data frame equals to the current output data count of the slave device sending the input data frame to the master device. The master device may check the output data count of the input data frame to determine whether such slave device correctly receives its output data in the output data frame during the refresh cycle.

Figure 11A:
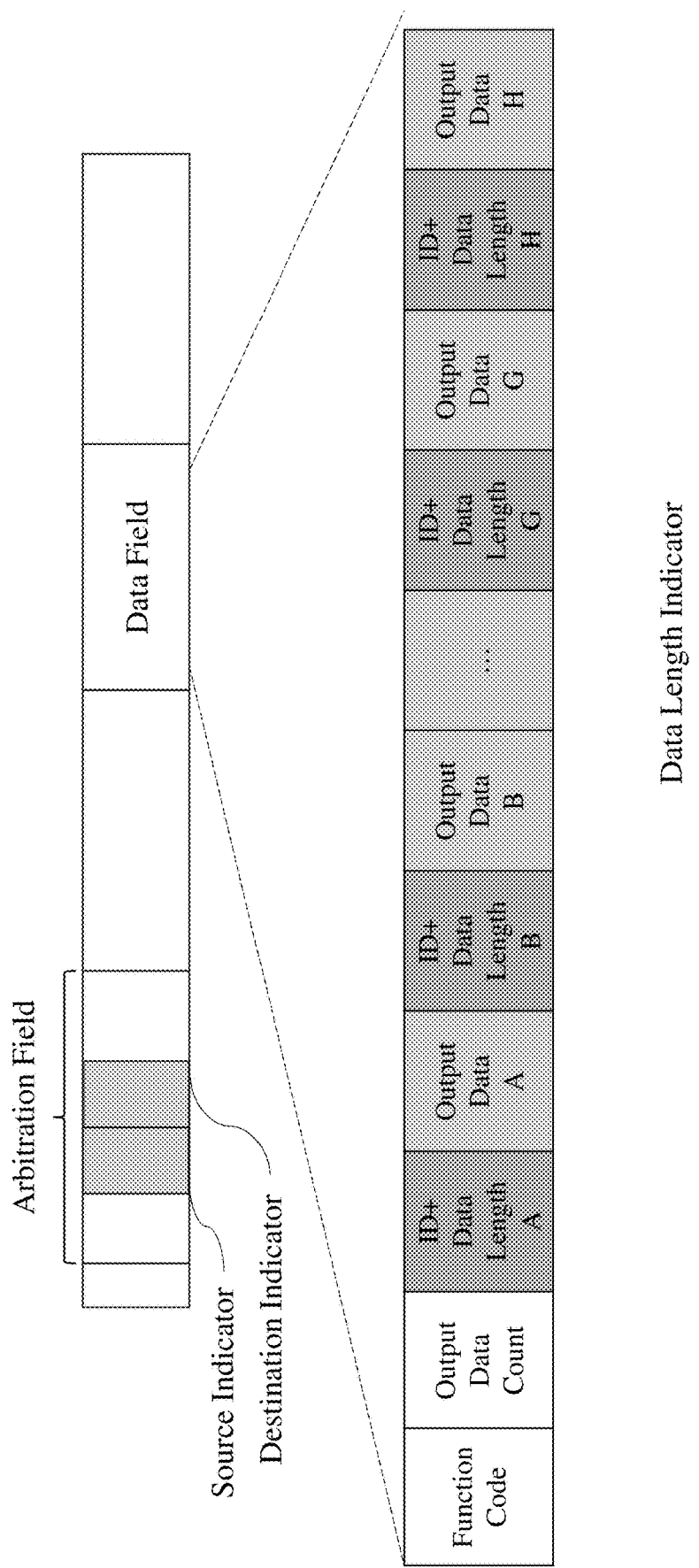
FIG. 11A is a schematic diagram illustrating the output data frame according to another embodiment of the present disclosure.

As another embodiment of output data frame shown in FIG. 11A, after the function code and the output data count in the data field, the data length indicator for each slave device in the group of 8 slave devices, e.g. A-H, is discrete, rather than continuous. The data length indicator for the first slave device A is separated from the data length indicator for the second slave device B by the output data for the first slave device A. In other words, the data length indicator for the first slave device is directly followed by its output data, rather than the data length indicator for the second slave device. The same arrangement in the data field is applied to each slave device. As a result, the data length indicator for each slave device interleaves with the output data for each slave device. The data length indicator for each slave device may be the same or similar to the embodiments previously described, e.g. 2, 3, or, 4 bits long. Alternatively, the data length indicator for each slave device may have two parts. The first part is an identification of the slave device. In one embodiment, the identification (ID) may be a sequential order of the slave device in the group, e.g. 1-8, or the device ID. The second part is to indicate the actual data length of the slave device, like the original data length indicator for each slave device. If the two-part data length indicator is used, the data length indicator for the slave device which receives zero new output data may be omitted because the data length indicator for each salve device includes the identification of the slave device.

As shown in FIG. 11B, the data length indicator for the slave device A includes the ID of the slave device A and the data length of 11 indicating the following 4 words are the output data for the slave device A. The data length indicator for the slave device B includes the ID of the slave device B and the data length of 10 indicating the following 2 words are the output data for the slave device B. The data length indicator for the slave device D includes the ID of the slave device D and the data length of 10 indicating the following 2 words are the output data for the slave device D. The data length indicator for the slave device E includes the ID of the slave device E and the data length of 11 indicating the following 4 words are the output data for the slave device E. The data length indicator for the slave device C is omitted here because it does not receive output data in this output data frame.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present disclosure covers modifications and variations that come within the scope of the appended claims and their equivalents.

What is claimed is:

1. A system for data communication using controller area network (CAN) protocol, comprising:
   a master device; and
   at least one group of slave devices comprising multiple slave devices connected to the master device to receive at least one output data frame from the master device;
   wherein the at least one output data frame includes a destination indicator and a data length indicator, the destination indicator is configured to indicate multiple slave devices for receiving the at least one output data frame, and the data length indicator is configured to indicate a data length to be received by each slave device in the at least one group of slave devices.

2. The system for data communication of claim 1, wherein the at least one output data frame includes an arbitration field and a data field; the arbitration field includes at least one of the destination indicator, the data length indicator, an output data count, and a function code; the output data count is configured to indicate a serial number of refresh cycle conducted by the master device; and the function code is configured to indicate whether each slave device connected to the master device is requested to send an input data frame to the master device.

3. The system for data communication of claim 1, wherein the at least one output data frame includes an arbitration field and a data field; the arbitration field includes the destination indicator; and the data field includes at least one of the data length indicator, an output data count, and a function code.

4. The system for data communication of claim 1, wherein the data length to be received by each slave device in the at least one group is not larger than a maximum data length which is four, five, or six words.

5. The system for data communication of claim 3, wherein the data field includes a function code configured to indicate whether each slave device connected to the master device is requested to send an input data frame to the master device or to indicate an arrangement of output data from the master device to each slave device in the at least one group.

6. The system for data communication of claim 3, wherein the data field includes an output data count configured to indicate a serial number of output data received by the slave device.

7. The system for data communication of claim 6, wherein the slave device in the at least one group updates its output data count if the slave device receives new output data in the at least one output data frame.

8. The system for data communication of claim 3, wherein the at least one group of slave devices has multiple groups of slave devices and the destination indicator is configured to indicate at least one of the multiple groups of slave devices.

9. The system for data communication of claim 1, wherein the master device requests, by a function code in the at least one output data frame, each slave device connected to the master device to send an input data frame to the master device.

10. The system for data communication of claim 9, wherein the slave device sends the input data frame to the master device, the input data frame includes an output data count configured to indicate a serial number of refresh cycle conducted by the master device.

11. The system of data communication of claim 9, wherein after receiving a request in the at least one output data frame for sending the input data frame to the master device, each slave device sets a timeout period for sending out its own input data frame to the master device.

12. The system for data communication of claim 10, wherein the master device determines whether the slave device receives its output data based on the output data count in the input data frame received from the salve device.

13. The system for data communication of claim 12, wherein if the master device determines that the slave device does not receive its new output data because the output data count of the slave device does not equal to the output data count of the master device, the master device resends an output data frame to the slave device.

14. A method for data communication between a master device and at least one group of multiple slave devices connected to the master device using controller area network (CAN) protocol, comprising:
    the master device sending an output data frame to the at least one group of multiple slave devices and requesting that each slave device in the at least one group of slave devices connected to the master device send an input data frame to the master device; and
    each slave device in the at least one group of slave devices sending the input data frame to the master device;

wherein the at least one output data frame includes a data length indicator configurated to indicate a data length to be received by each slave device in the at least one group of slave devices.

15. The method for data communication of claim 14, wherein the data length to be received by each slave device in the at least one group is not larger than a maximum data length which is four, five, or six words.

16. The method for data communication of claim 14, wherein the at least one output data frame includes an arbitration field and a data field, the arbitration field includes a destination indicator and the data field includes at least one of the data length indicator, an output data count, and a function code.

17. The method for data communication of claim 16, wherein the data field includes a function code configured to indicate whether each slave device connected to the master device is requested to send an input data frame to the master device or to indicate an arrangement of output data from the master device to each slave device in the at least one group.

18. The method for data communication of claim 16, wherein the data field includes an output data count configured to indicate a serial number of output data received by the slave device.

19. The method for data communication of claim 18, wherein the slave device in the at least one group updates its output data count if the slave device receives new output data in the at least one output data frame.

20. The method for data communication of claim 16, wherein the at least one group of slave devices has multiple groups of slave devices and the destination indicator is configured to indicate at least one of the multiple groups of slave devices.

21. The method for data communication of claim 14, wherein the master device requests, by a function code in the at least one output data frame, each slave device connected to the master device to send an input data frame to the master device.

22. The method for data communication of claim 21, wherein the input data frame includes an output data count configured to indicate a serial number of refresh cycle conducted by the master device.

23. The method of data communication of claim 21, wherein after receiving a request in the at least one output data frame for sending the input data frame to the master device, each slave device sets a timeout period for sending out its own input data frame to the master device.

24. The method for data communication of claim 22, wherein the master device determines whether the slave device receives its output data based on the output data count in the input data frame received from the salve device.

25. The method for data communication of claim 22, wherein if the master device determines that the slave device does not receive its new output data because the output data count of the slave device does not equal to the output data count of the master device, the master device resends an output data frame to the slave device.

* * * * *